(12) United States Patent
Motschi (10) Patent No.: US 11,033,971 B2
(45) Date of Patent: Jun. 15, 2021

(54) CLAMPING DEVICE FOR HOLDING A COLLET

(71) Applicant: Schaublin SA, Delémont (CH)

(72) Inventor: René Motschi, Oberbuchsiten (CH)

(73) Assignee: Schaublin SA, Delémont (CH)

( * ) Notice: Subject to any disclaimer, the term of this patent is extended or adjusted under 35 U.S.C. 154(b) by 0 days.

(21) Appl. No.: 15/974,063

(22) Filed: May 8, 2018

(65) Prior Publication Data
US 2018/0326505 A1    Nov. 15, 2018

Related U.S. Application Data

(60) Provisional application No. 62/503,434, filed on May 9, 2017.

(51) Int. Cl.
*B23B 31/20*   (2006.01)
*B25B 5/16*    (2006.01)
*B23B 31/26*   (2006.01)

(52) U.S. Cl.
CPC .......... *B23B 31/202* (2013.01); *B23B 31/265* (2013.01); *B25B 5/163* (2013.01);
(Continued)

(58) Field of Classification Search
CPC ................ B23B 31/202; B23B 31/265; B23B 2231/201; B23B 2260/136; B23B 2231/2045; B25B 5/163
See application file for complete search history.

(56) References Cited

U.S. PATENT DOCUMENTS 2,291,147 A    7/1942 Carlsen
2,824,744 A    2/1958 Peters
(Continued)

FOREIGN PATENT DOCUMENTS

DE    102009021407 A1    12/2010
EP    0271355 A2 *    6/1988    ........... B23B 31/207
(Continued)

OTHER PUBLICATIONS

European Search Report issued in corresponding EP Application No. 18171373.6 dated Oct. 18, 2018.
(Continued)

*Primary Examiner* — Eric A. Gates
*Assistant Examiner* — Paul M Janeski
(74) *Attorney, Agent, or Firm* — Murtha Cullina LLP (57) ABSTRACT

A clamping device includes a first clamping segment which has a first mounting flange and a tubular member extending axially away therefrom. A first bore extends through the first mounting flange and the tubular member. The first mounting flange is configured for attachment to a rotatable spindle of a machine tool. The clamping device includes a draw bar assembly which has an axially extending elongate shaft. The elongate shaft extends through the first bore of the first clamping segment. A biasing unit is mounted on or in the tubular member. A locking member is removably secured to the elongate shaft such that the biasing unit is compressed between the locking member and a portion of the first clamping segment. The biasing member remains compressed when the first clamping segment is separated from the spindle of the machine tool.

30 Claims, 7 Drawing Sheets (52) U.S. Cl.
CPC . *B23B 2231/201* (2013.01); *B23B 2231/2045* (2013.01); *B23B 2260/136* (2013.01)

(56) References Cited

U.S. PATENT DOCUMENTS

| | | | |
|---|---|---|---|
| 4,122,755 A | 10/1978 | Johnson et al. | |
| 4,171,820 A * | 10/1979 | Klancnik | B23B 31/201 |
| | | | 279/50 |
| 4,604,012 A * | 8/1986 | Kawasaki | B23B 31/263 |
| | | | 279/82 |
| 4,642,005 A | 2/1987 | Kondo et al. | |
| 4,777,715 A | 10/1988 | Roberts | |
| 4,943,071 A | 7/1990 | Srebot et al. | |
| 4,971,339 A | 11/1990 | Treff | |
| 5,033,922 A | 7/1991 | Watanabe et al. | |
| 5,322,494 A | 6/1994 | Holtey et al. | |
| 5,326,114 A | 7/1994 | Piotrowski | |
| 5,560,624 A | 10/1996 | Williams et al. | |
| 5,662,442 A | 9/1997 | Taki et al. | |
| 5,855,377 A * | 1/1999 | Murphy | B23B 31/201 |
| | | | 279/50 |
| 5,860,776 A | 1/1999 | Sato et al. | |
| 6,149,357 A | 11/2000 | Skellon | |
| 6,238,152 B1 | 5/2001 | Fujimoto et al. | |
| 6,287,059 B1 | 9/2001 | Hashidate et al. | |
| 6,582,167 B1 | 6/2003 | Sugata et al. | |
| 6,598,884 B1 * | 7/2003 | McCluskey | B23B 31/36 |
| | | | 279/51 |
| 6,926,478 B2 | 8/2005 | Sugata et al. | |
| 7,048,481 B2 | 5/2006 | Sugata et al. | |
| 7,137,632 B2 | 11/2006 | Smith | |
| 7,331,742 B2 | 2/2008 | Kikkawa et al. | |
| 8,083,445 B2 | 12/2011 | Hyatt et al. | |
| 2005/0087046 A1 * | 4/2005 | Smith | B23B 31/205 |
| | | | 82/1.11 |
| 2005/0220556 A1 | 10/2005 | Takase et al. | |
| 2007/0110533 A1 | 5/2007 | Geissler et al. | |
| 2008/0112769 A1 | 5/2008 | Mochizuki et al. | |
| 2008/0315535 A1 * | 12/2008 | Mohr | B23B 31/02 |
| | | | 279/62 |
| 2009/0053005 A1 | 2/2009 | Kikkawa | |
| 2009/0116924 A1 | 5/2009 | Shinano | |
| 2009/0279975 A1 | 11/2009 | Tada et al. | |
| 2015/0145219 A1 | 5/2015 | Saccomanno, III | |
| 2017/0225237 A1 | 8/2017 | Mihailovic | |
| 2017/0232525 A1 | 8/2017 | Curtis et al. | |
| 2017/0355024 A1 | 12/2017 | Motschi | |
| 2018/0021745 A1 | 1/2018 | Hamaker et al. | |

FOREIGN PATENT DOCUMENTS

| | | | | |
|---|---|---|---|---|
| WO | | 2004007128 A1 | 1/2004 | |
| WO | WO-2007114483 A1 * | | 10/2007 | B23B 31/265 |
| WO | | 2010090261 A1 | 8/2010 | |
| WO | | 2013041567 A1 | 3/2013 | |
| WO | | 2013125326 A1 | 8/2013 | |

OTHER PUBLICATIONS

Office Action issued in corresponding CN Application No. 201810436022.0 dated Jan. 28, 2021, pp. 1-7.

* cited by examiner

CLAMPING DEVICE FOR HOLDING A COLLET

CROSS REFERENCE TO RELATED APPLICATION

The instant application is a non-provisional of, and claims priority to, U.S. Provisional Patent Application No. 62/503,434, filed on May 9, 2017 and entitled "Clamping Device for Holding a Collet", the entirety of which is incorporated by reference herein.

TECHNICAL FIELD

The present invention relates generally to collets and other clamping tools, such as but not limited to, expanding arbors, tool holders of various types and similar tooling, and, more particularly, to a collet attachment system including a clamping device for minimizing dispersion and angular clamping error of a collet retained in the collet attachment system. The system allows improved handling and reduces set up times.

BACKGROUND

Typically, collet devices have two or more "jaws" between which an object such as a tool or a workpiece can be positioned. The jaws form a collar around the object. The jaws of the collet are configured to constrict around the object and may be effected by pushing suitable mechanism around the circumference of the collet. In another type of collet, sometimes referred to as a draw-in collet, the collet is tapered and drawn into a sleeve to cause the jaws to constrict around the tool or workpiece. Collets are typically fabricated from steel, which allows the jaws to be sufficiently flexible relative to each other to facilitate the constriction of the tool or workpiece.

In general, collets are held in a clamping device, which is connected to a shaft that can be rotated which in turn causes the tool or the workpiece to rotate. In instances in which a tool is clamped in the collet and rotated, the tool is made to engage or be engaged by a workpiece. In instances in which the workpiece is clamped in the collet and rotated, the workpiece engages or is engaged by a tool.

The rotational accuracy of the tool or the workpiece affects the process of removing swarf from the workpiece. In particular, the rotational accuracy of the tool or the workpiece is typically a function of concentricity along the axis of rotation. The concentricity achieved with mechanical clamping is often inadequate or compromised during rotation, thereby resulting in runout, which will detrimentally affect the finished workpiece. Due to different influences from the pulling device of the machine tool and many other influences, at each clamping cycle the concentricity may change and create a certain dispersion of runout accuracy.

In some of the existing clamping systems for collets, changing of the clamping system is a complex process that requires the entire clamping system to dismounted from the machine, and at each collet change, the clamping force has to be readjusted.

Based on the foregoing, there is a need to provide a collet and clamping device that provides improved runout accuracy and a more simple process for changing the clamping system and/or collet on a machine.

SUMMARY

There is disclosed herein a clamping device for holding a collet that includes a first clamping segment which has a first mounting flange and a tubular member extending axially away from the first mounting flange. A first bore extends through the first mounting flange and the tubular member. The first mounting flange is configured for attachment to a rotatable spindle of a machine tool. The clamping device includes a draw bar assembly which has an elongate shaft that extends axially from a first end to a second end thereof. The elongate shaft extends through the first bore of the first clamping segment. A biasing unit (e.g., a spring configuration) is mounted on or in the tubular member. A locking member is removably secured to the elongate shaft of the draw bar assembly such that the biasing unit is compressed between the locking member and a portion of the first clamping segment. The biasing member remains compressed when the first clamping segment is separated from the spindle of the machine tool.

In one embodiment, the first mounting flange is configured for receiving a second clamping segment. The second clamping segment has a second mounting flange and a collet receiving portion extending axially away from the second mounting flange. A second bore extends through the second mounting flange and the collet receiving portion. The second mounting flange is removably coupled to the first mounting flange. The draw bar assembly includes a collet receiving member extending from the elongate shaft. The collet receiving member is disposed in the second bore of the second clamping segment.

In one embodiment, a collet is removably coupled to the collet receiving member. The collet has tool or work piece holding jaws formed proximate an end thereof.

In one embodiment, the collet receiving member is removably secured to the elongate shaft. In one embodiment, the collet receiving member is removably secured to the elongate shaft by radially rotating the collet receiving member into the elongate shaft. For example, the collet receiving member includes a first threaded area and the elongate shaft includes a second threaded area which is in threading engagement with the first threaded area to removably secure the collet receiving member to the elongate shaft.

In one embodiment, the collet is removably secured to the collet receiving member. In one embodiment, the collet is removably secured to the collet receiving member by radially rotating the collet into the collet receiving member. For example, the collet receiving member includes a third threaded area and the collet includes a fourth threaded area which threadlingly engages the third threaded area to removably secure the collet to the collet receiving member.

In one embodiment, the first clamping segment is configured to receive at least two different size second clamping segments which are configured to receive a respective sized collet.

In one embodiment, the tubular member has a radially extending abutment surface that is positioned in the first bore of the tubular member in a predetermined axial position. The abutment surface is configured to engage a circumferential lip that extends radially outward from the elongate shaft of the draw bar to limit axial movement of the collet and to prevent damage to the collet.

In one embodiment, the elongate shaft includes one or more recesses configured to impart radial flexibility to the elongate shaft. In one embodiment, there is a gap between an exterior surface of the elongate shaft and an inside surface defined by the first bore to accommodate the radial flexibility of the draw bar.

In one embodiment, the locking member includes an interior surface that is complementary to and sliding engages an exterior surface of the tubular member, to guide the draw bar, thereby controlling radial eccentricity of the draw bar assembly. In one embodiment, the locking member includes an exterior surface that is complementary to and sliding engages an interior surface of the tubular member, to guide the draw bar assembly, thereby controlling radial eccentricity of the draw bar assembly.

In one embodiment, the biasing unit surrounds an exterior surface of the tubular member. In one embodiment, the biasing unit is disposed in an interior area defined by the tubular member.

In one embodiment, the locking member is threaded onto a threaded area of the elongate shaft. In one embodiment, there is a first anti-rotation device that extends through the locking member and frictionally engages the elongate shaft to prevent rotation of the locking member relative to the elongate shaft. The draw bar includes a circumferential lip which extends radially outward from the elongate shaft. The circumferential lip has an axial slot formed therein. A second anti-rotation device extends through the tubular member and is positioned in the slot to prevent rotation of the draw bar assembly relative to the tubular member.

In one embodiment, the first mounting flange includes a plurality of first holes that extend axially therethrough. A plurality of first fasteners extend through a respective one of the plurality of first holes for threading engagement with corresponding first threaded bores in the spindle of the machine tool. The first mounting flange includes a plurality of second threaded bores extending axially at least partially into the first mounting flange. The second mounting flange includes a plurality of second holes extending axially therethrough. A plurality of second fasteners extend through a respective one of the second holes and threaded into a respective one of the second threaded bores to removably secure the second mounting flange to the first mounting flange.

In one embodiment, the first mounting flange includes a plurality of first holes that extend axially therethrough. At least a subset of the plurality of the second fasteners extend through a respective one of the plurality of first holes for threading engagement with corresponding first threaded bores in the spindle of the machine tool.

In one embodiment, the second clamping segment includes a plurality of adjustment screws threaded radially into the second mounting flange for adjusting the angular error of a collet.

In one embodiment, collet receiving member includes a threaded area for receiving a respective threaded area of the collet. In one embodiment, the collet receiving member includes at least one axially extending slot to form at least one axial leg on the collet receiving member.

In one embodiment, the biasing unit includes at least one coil spring. In one embodiment, the biasing unit includes at least one disc spring.

There is also disclosed herein a clamping device that includes a first clamping segment that has a first mounting flange and a tubular member that extends axially away from the first mounting flange. A first bore extends through the first mounting flange and the tubular member. The first mounting flange is configured for attachment to a rotatable spindle of a machine tool and for receiving a second clamping segment. The second clamping segment has a second mounting flange and a collet receiving portion extending axially away from the second mounting flange. A second bore extends through the second mounting flange and the collet receiving portion. The second mounting flange is removably coupled to the first mounting flange. The clamping device includes a draw bar assembly that includes an elongate shaft and a collet receiving member which extends from the elongate shaft. The elongate shaft extends axially from a first end to a second end thereof. The elongate shaft extends through the first bore of the first clamping segment. The collet receiving member is disposed in the second bore of the second clamping segment. A collet is coupled to the collet receiving member. The collet has tool or work piece holding jaws formed proximate an end thereof. The clamping device includes a biasing unit mounted on or in the tubular member. A locking member is removably secured to the elongate shaft of the draw bar assembly such that the biasing unit is compressed between the locking member and a portion of the first clamping segment. The biasing member remains compressed when the first clamping segment is separated from the spindle of the machine tool.

There is further disclosed herein a method for changing out a collet clamping device on a spindle of a machine tool. The method includes providing a first clamping segment having a first mounting flange and a tubular member that extends axially away from the first mounting flange. A first bore extends through the first mounting flange and the tubular member. A draw bar assembly is also provided which includes an elongate shaft that extends axially from a first end to a second end thereof. The elongate shaft extends through the first bore of the first clamping segment. A biasing unit is mounted on or in the tubular member. A locking member is removably secured to the elongate shaft of the draw bar assembly such that the biasing unit is compressed between the locking member and a portion of the first clamping segment. The method includes securing the first mounting flange to the spindle of the machine tool, with the biasing unit compressed between the locking member and a portion of the first clamping segment. The method also includes removing the first mounting flange from the spindle of the machine tool, with the biasing unit compressed between the locking member and a portion of the first clamping segment.

DETAILED DESCRIPTION

Figure 1A:
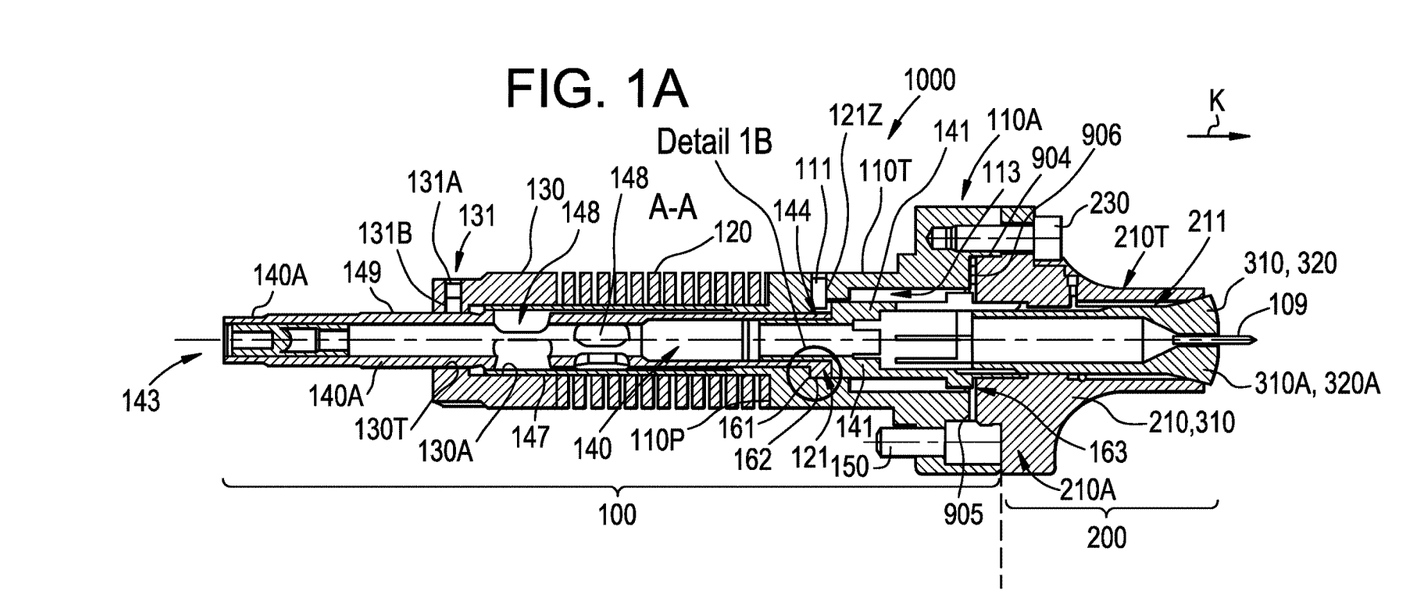
FIG. 1A is a cross sectional view of the clamping device for holding a collet of the present invention taken across section A-A of FIG. 2 and shown holding a cutting tool.

As shown in FIG. 1, a clamping device for holding a collet is generally designated by the number 1000. The clamping device 1000 includes a first clamping segment (e.g., a cartridge portion) 100 removably secured to a second clamping segment (e.g., a collet chuck) 200. The first clamping segment 100 includes a first mounting flange 110A and a tubular member 110T extending axially away from the first mounting flange 110A. A first bore 113 extends through the first mounting flange 110A and the tubular member 110T. The first mounting flange 110A is configured for attachment to a rotatable spindle of a machine tool (not shown). The first clamping segment 100 includes a draw bar assembly 140 that includes an elongate shaft 140A that extends axially from a first end 143 to a second end 144 thereof. The elongate shaft 140A extends through the first bore 113 of the first clamping segment 100. The first clamping segment 100 includes a biasing unit 120 (e.g., one or more coil springs 120' (FIG. 9) and/or disc springs 120 (FIG. 1A)) mounted on (as in FIG. 1A) or in as in FIG. 3) the tubular member 110T. The first clamping segment 100 includes a locking member 130 (e.g., a threaded nut with female threads 130T) removably secured (e.g., threaded onto) male threads 149 on the elongate shaft 140A such that the biasing unit 120, 120' is compressed between the locking member 130 and a portion of the first clamping segment 100. The biasing unit 120, 120' surrounds an exterior surface 147 of the tubular member 110T.

Figure 9:
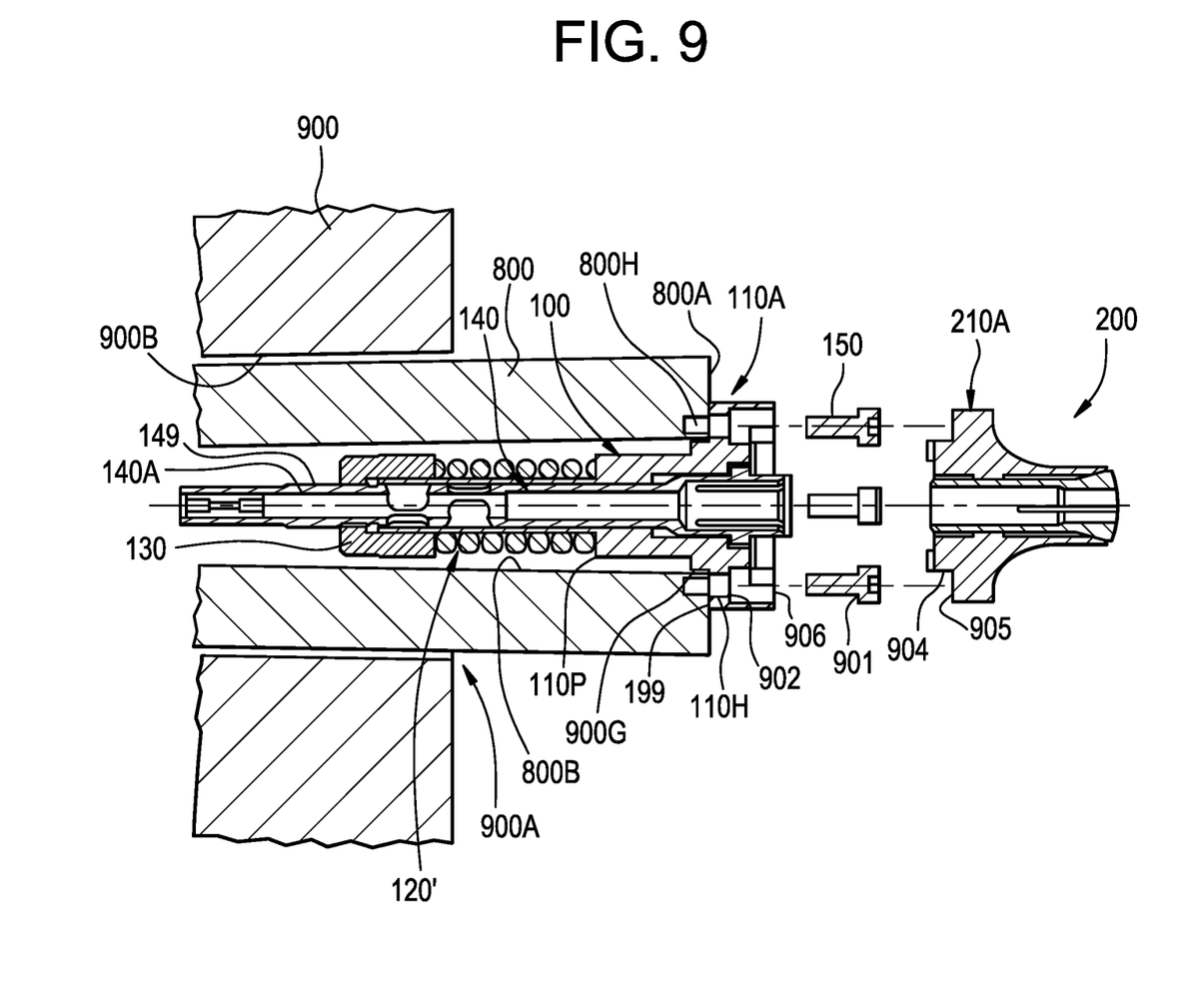
FIG. 9 is a cross sectional view of the clamping device for holding a collet of the present invention taken across section B-B of FIG. 2 and shown with a first clamping segment installed in a compressed state in a spindle of a machine tool and with a second clamping portion separated from the first clamping portion.

As shown in FIG. 9, the first clamping segment 100 is secured to a spindle 800 of a machine tool 900. The spindle 800 is rotatably mounted in the machine tool 900 through an axial opening 900A that extends into a bore 900B therein. During the installation of the first clamping segment 100 onto the spindle 800, a radially outward facing circumferential guide surface 900G is slid into a bore 800B of the spindle 800 through an opening in an axial end 800A thereof. When the first clamping segment 100 is secured to the spindle 800 an axial facing abutment surface 199 engages the axial end 800A of the spindle. One of the first fasteners 150 extend through a respective one of the plurality of first holes 110H for threading engagement with corresponding first threaded bores 800H in the spindle 800 of the machine tool 900. Shoulder portions 901 of each of the first fasteners 150 engage an axial abutment surface 902 in each of the respective first holes 110H. When the first clamping segment 100 is installed on the spindle 800, the second clamping segment 200 is guided into the first clamping segment 100 via a radially outward facing circumferential guide surface 904. The second clamping segment 200 is secured to the first clamping segment 100 with the second fasteners 230 as shown, for example, in FIG. 1A so that an axial face 905 of the second clamping segment abuts an axial face 906 of the first clamping segment 100. Disengaging the first clamping segment 100 from the spindle 800 of the machine tool 900 is accomplished in reverse of the foregoing installation steps.

Figure 10:
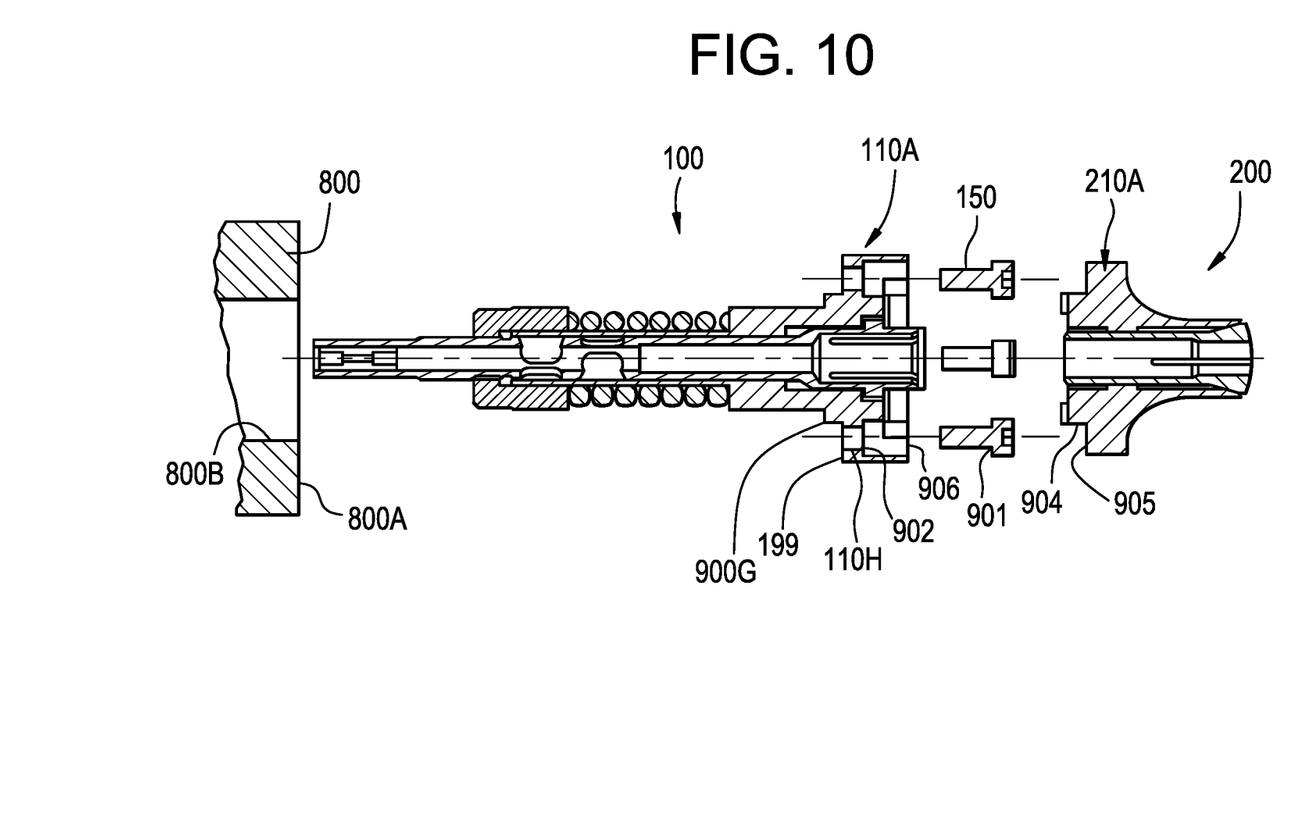
FIG. 10 is a cross sectional view of the clamping device for holding a collet of the present invention taken across section B-B of FIG. 2 and shown with a first clamping segment remaining in a compressed state when removed from the spindle of the machine tool and with a second clamping portion separated from the first clamping portion.

As shown in FIG. 10, the biasing member 120' (and 120 in FIG. 1A) remains compressed when the first clamping segment 100 is separated from the spindle 800 of the machine tool 900.

The first mounting flange 110A is configured for receiving a second clamping segment 200. The second clamping segment 200 has a second mounting flange 210A and a collet receiving portion 210T extending axially away from the second mounting flange 210A. A second bore 211 extends through the second mounting flange 210A and the collet receiving portion 210T. The second mounting flange 210A is removably coupled to the first mounting flange 110A, as described herein.

The draw bar assembly 140 includes a collet receiving member 141 extending from the elongate shaft 140A. The collet receiving member 141 is disposed in the second bore 211 of the second clamping segment 200.

In one embodiment, the clamping device includes a collet 310, 320 removably coupled to the collet receiving member 141. The collet 310, 320 have tool or work piece holding jaws 310A, 320A formed proximate an end thereof. The clamping device 1000 is shown in a clamping configuration with a work piece 109 clamped in the jaws 310A, 320A, with the draw bar assembly 140, collet receiving member 141 and collet 310, 320 in a clamping position. The direction of the arrow K shows the opening direction which is limited by the shoulders of gap 163.

Figure 6:
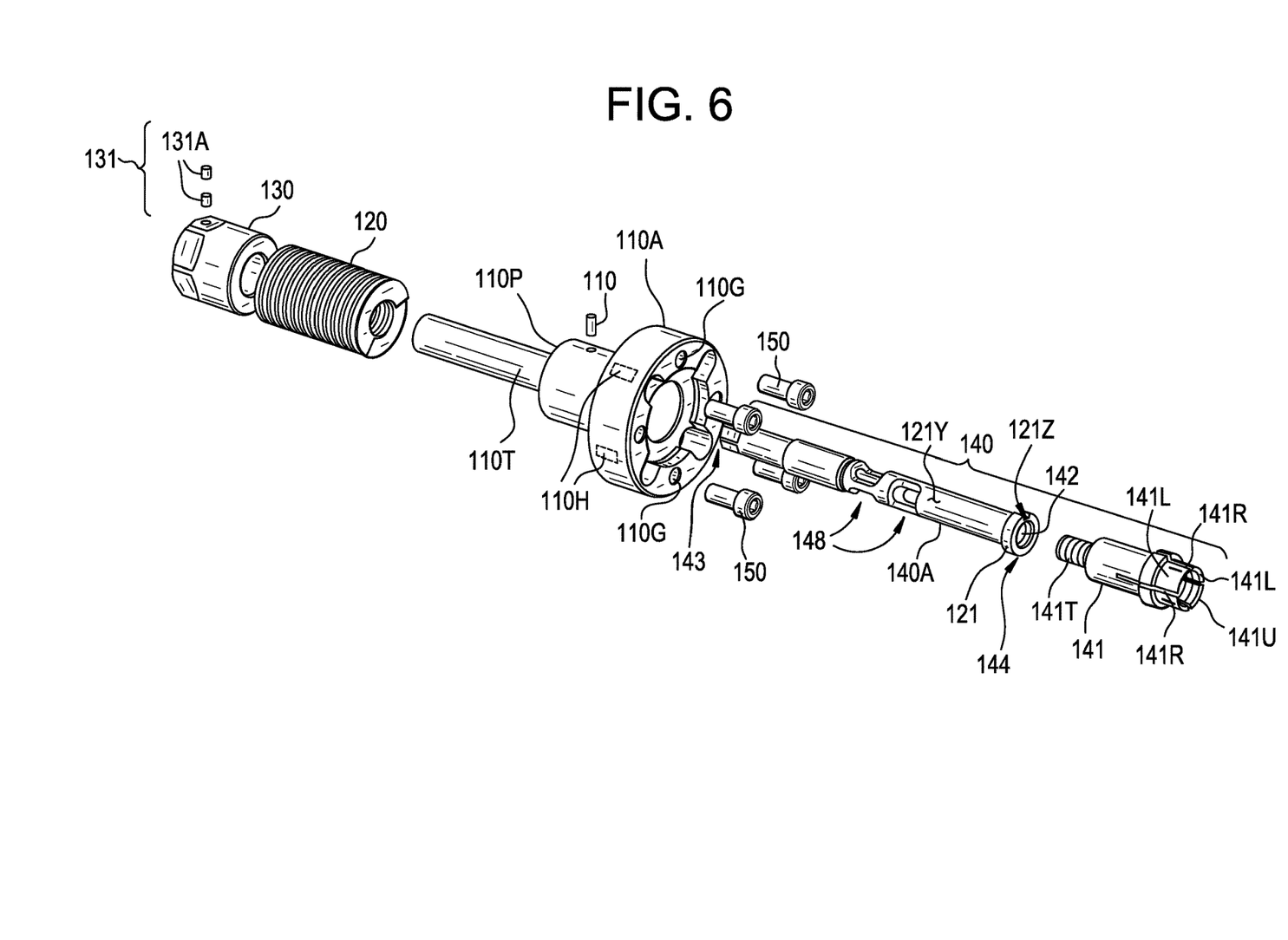
FIG. 6 is an exploded view of a portion of the clamping device for holding a collet of FIG. 1A.

The collet receiving member 141 is removably secured to the elongate shaft 140A. In one embodiment, collet receiving member 141 is removably secured to the elongate shaft 140A by radially rotating the collet receiving member 141 into the elongate shaft 140A. For example, as best shown in FIG. 6, the collet receiving member 141 has a first threaded area 141T (e.g., a male thread) and the elongate shaft 140A has a second threaded area 142 (e.g., a female thread) which is in threading engagement with the first threaded area 141T to removably secure the collet receiving member 141 to the elongate shaft 140A.

Figure 7:
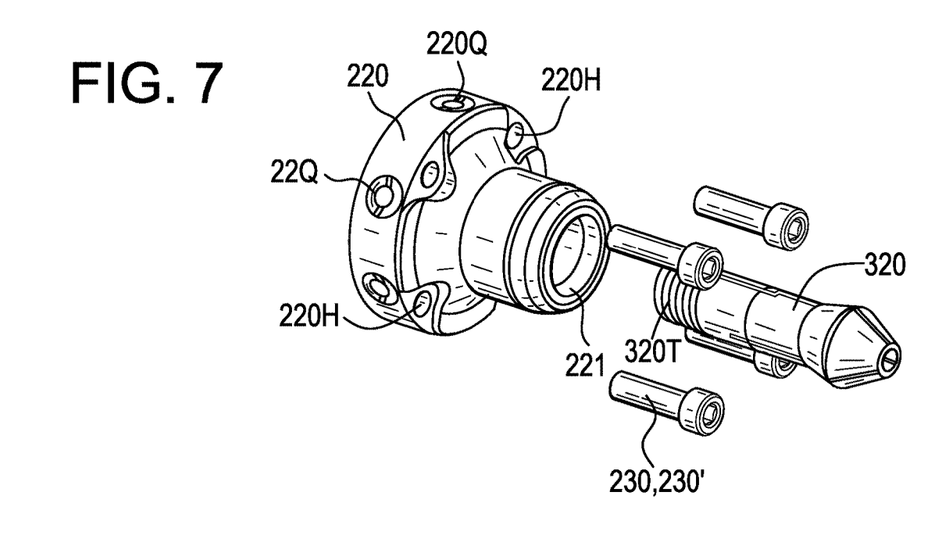
FIG. 7 is an exploded view of a portion of the clamping device for holding a collet of FIG. 1A.
Figure 8:
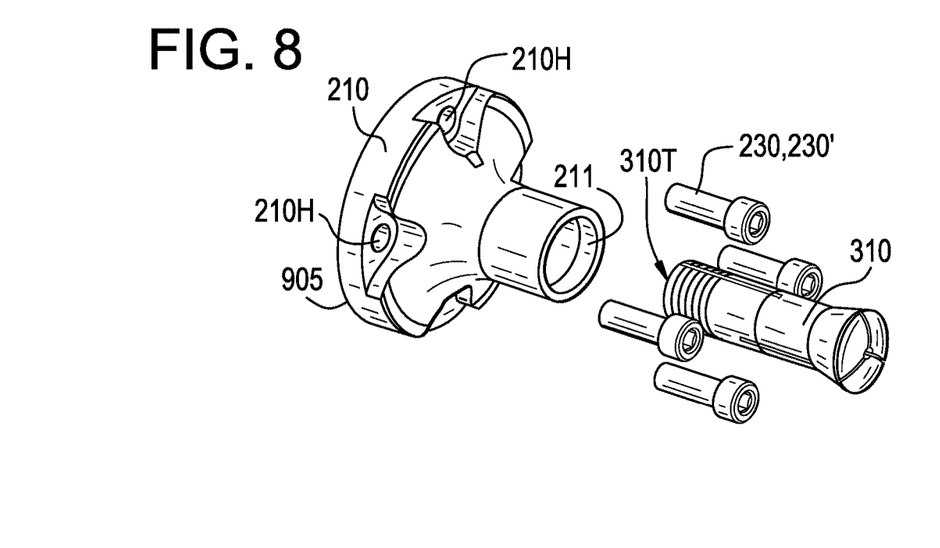
FIG. 8 is an exploded view of a portion of another embodiment of the clamping device for holding a collet of FIG. 1A.

The collet 310, 320 is removably secured to the collet receiving member 141. In one embodiment, the collet 310, 320 is removably secured to the collet receiving member 141 by radially rotating the collet 310, 320 into the collet receiving member 141. For example, as best shown on FIG. 6, the collet receiving member 141 includes a third threaded area 141U (e.g., a female thread) and as shown in FIGS. 7 and 8, the collet 310, 320 includes a fourth threaded area 310T, 320T (e.g., male internal thread) which threadlingly engages the third threaded area 141U to removably secure the collet 310, 320 to the collet receiving member 141.

The first clamping segment 100 is configured to receive at least two different size second clamping segments 200 which are configured to receive a respective sized collet 310, 320 (e.g., collet sizes W15, W20, W25, etc.).

Figure 1B:
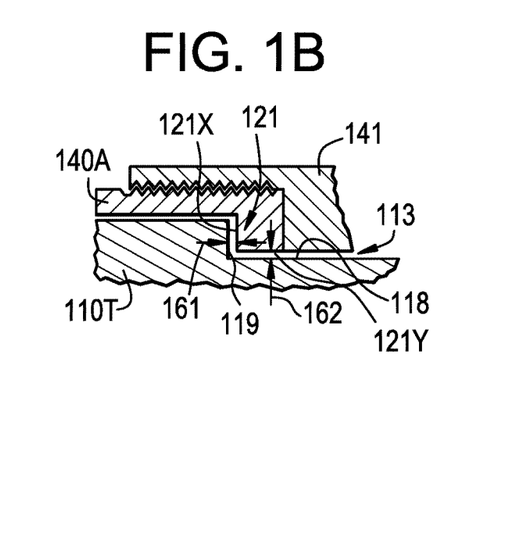
FIG. 1B is an enlarged view of detail 1B of FIG. 1A.
Figure 2:
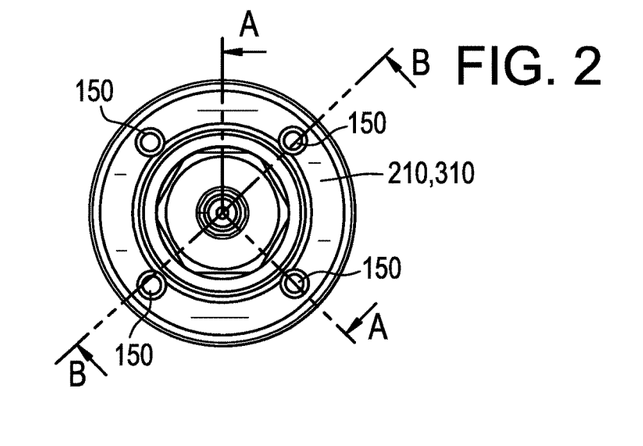
FIG. 2 is an end view of the clamping device for holding a collet of the present invention.

As best shown in FIG. 1B, the tubular member 110T has a radially extending and axially facing abutment surface 119 that is positioned in the first bore 113 of the tubular member 110T in a predetermined axial position. The abutment surface 119 is configured to engage an axial surface 121X of a circumferential lip 121 extending radially outward from the elongate shaft 140A of the draw bar 140 to limit axial movement of the collet 310, 320 and to prevent damage to the collet, when the work piece 109 is removed from the collet. When the work piece 109 is clamped in the collet 310, 320, a gap 161 is formed between the axial surface 121X and the abutment surface 119.

In one embodiment, the elongate shaft 140A of the draw bar assembly 140 includes at least one recess 148 configured to impart radial flexibility to the elongate shaft 140A. In one embodiment, the elongate shaft 140A is hollow. In one embodiment, a gap 162 is formed between an exterior surface 121Y of the elongate shaft 140A and an inside surface 118 defined by the first bore 113 to accommodate the radial flexibility of the draw bar.

Figure 3:
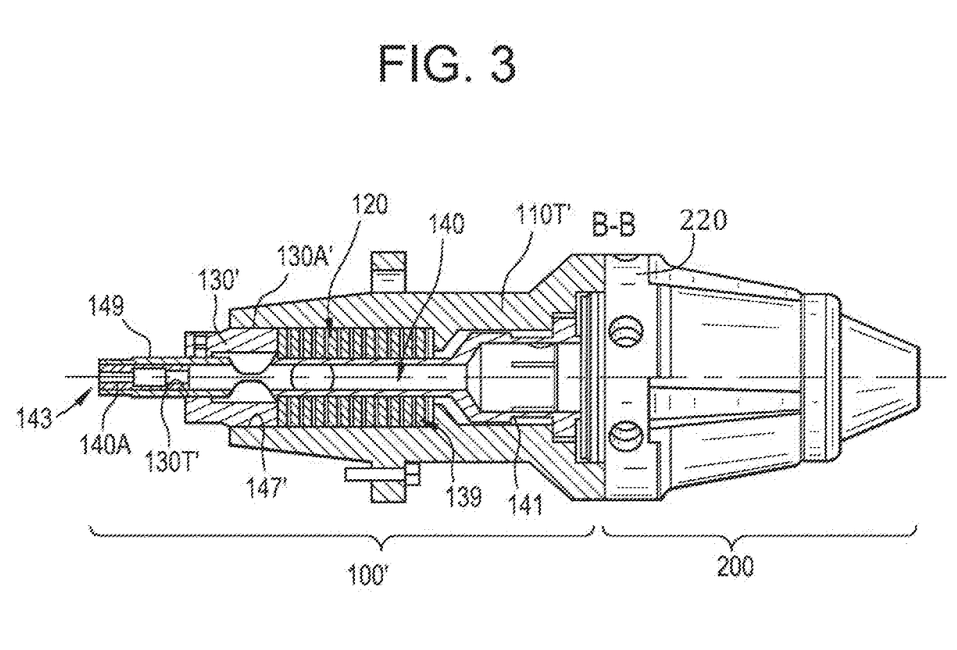
FIG. 3 is a cross sectional view of another embodiment of the clamping device for holding a collet of the present invention taken across section C-C of FIG. 4.
Figure 4:
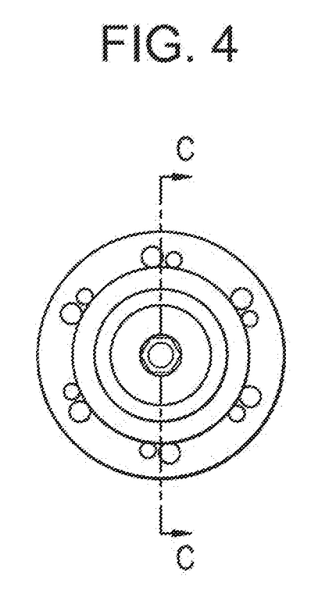
Figure 5:
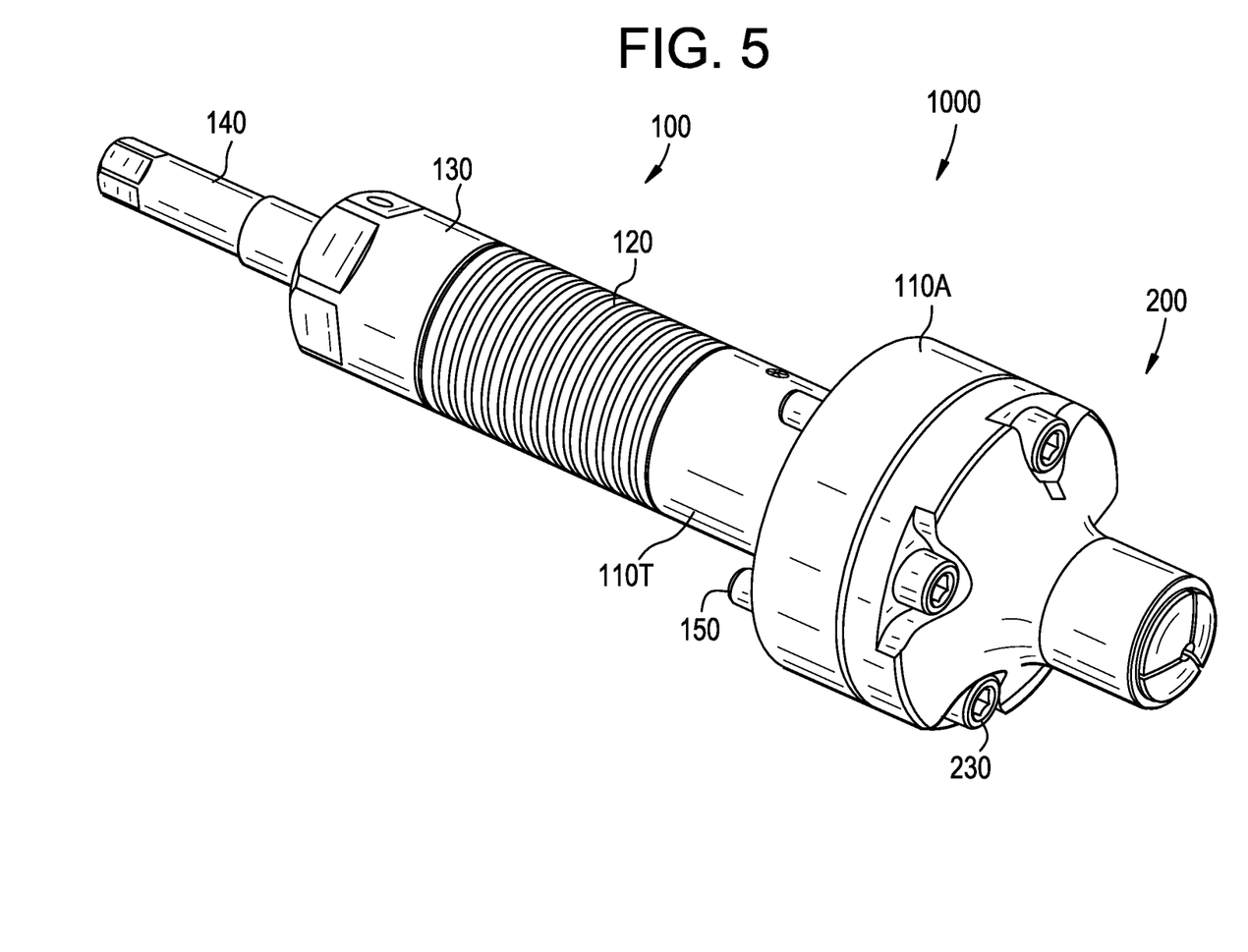
FIG. 5 is a perspective view of the clamping device for holding a collet of FIG. 1A.

As shown in FIG. 1A, the locking member 130 has an interior surface 130A that is complementary to and sliding engages an exterior surface 147 of the tubular member 110T, to guide the draw bar assembly 140 thereby controlling radial eccentricity of the draw bar assembly 140. However, the present invention is not limited in this regard as other configurations are contemplated including but not limited to that shown in FIGS. 3 and 4. For example, as shown in FIG. 3, the locking member 130' has an exterior surface 130A' that is complementary to and sliding engages an interior surface 147' of the tubular member 110T', to guide the draw bar assembly 140 thereby controlling radial eccentricity of the draw bar assembly 140. As shown in FIG. 3, the biasing unit 120 is disposed in an interior area 139 defined by the tubular member 110T'. The locking member 130' is threaded (e.g., female threads 130T') onto a threaded area 149 of the elongate shaft 140A.

As shown in FIGS. 1A and 6, a first anti-rotation device 131 (e.g., a pin 131B and a set screw 131A) extends through the locking member 130 and the pin 131B frictionally engages the elongate shaft 140A to prevent rotation of the locking member 130 relative to the elongate shaft 140A.

As shown in FIGS. 1A and 6, the elongate shaft 140A includes circumferential lip 121 that extends radially outward therefrom. The circumferential lip 121 has an axial slot 121Z formed therein. A second anti-rotation device 111 extends through the tubular member 110T and is positioned in the slot 121Z to prevent rotation of the draw bar assembly relative to the tubular member 110T.

As shown in FIG. 6, the first mounting flange 110A has a plurality of first holes 110H extending axially therethrough. A plurality of first fasteners 150 extend through a respective one of the plurality of first holes 110H for threading engagement with corresponding first threaded bores 800H in the spindle 800 of the machine tool 900 (shown in FIG. 9).

As shown in FIG. 6, first mounting flange 110A includes a plurality of second threaded bores 110G extending axially at least partially into the first mounting flange 110A. As shown in FIGS. 7 and 8, the second mounting flange 210, 220 each have a plurality of second holes 210H, 220H extending axially therethrough. A plurality of second fasteners 230 extend through a respective one of the second holes 210H, 220H and threaded into a respective one of the second threaded bores 110G to removably secure the second mounting flange 210, 220 to the first mounting flange 110A.

In one embodiment, the first mounting flange 110A has a plurality of first holes 110H extending axially therethrough and at least a subset of the plurality of the second fasteners 230' (longer than the fasteners 230) extend through a respective one of the plurality of first holes 110H for threading engagement with corresponding first threaded bores in the spindle of the machine tool (not shown).

As shown in FIG. 7, in one embodiment, the second clamping segment 200 has a plurality of adjustment screws 220Q threaded radially into the second mounting flange 210 for adjusting the angular error of the collet 320.

As shown in FIG. 6, the collet receiving member 141 has a threaded area 142 for receiving a respective threaded area 310T, 320 T (FIGS. 7 and 8) of the collet 310, 320.

In one embodiment, the collet receiving member 141 has at least one axially extending slot 141R to form at least one axial leg 141L on the collet receiving member 141.

The present invention includes a method for changing out a collet clamping device on a spindle 800 of a machine tool 900, shown in FIG. 9. The method includes providing a first clamping segment 100 having a first mounting flange 110A and a tubular member 110T extending axially away from the first mounting flange 110A, a first bore 113 extending through the first mounting flange 110A and the tubular member 110T, a draw bar assembly 140 including an elongate shaft 140A that extends axially from a first end 143 to a second end 144 thereof. The elongate shaft 140A extends through the first bore 113. A biasing unit 120 is mounted on or in the tubular member 110T and a locking member 130, 130' is removably secured to the elongate shaft 140A of the draw bar assembly 140 such that the biasing unit 120 is compressed between the locking member 130, 130' and a portion of the first clamping segment 110A.

The method includes securing the first mounting flange 110A to the spindle 800 of the machine tool 900, a s shown in FIG. 9, with the biasing unit 120' (e.g., coil spring) compressed between the locking member 130 and a portion 110P (axial shoulder) of the first clamping segment 100. When the first mounting flange 110A is removed from the spindle 800 of the machine tool 900, as shown in FIG. 9 with the biasing unit 120 is compressed between the locking member 130 and a portion of the first clamping segment 110A.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:
1. A clamping device for holding a collet, the clamping device comprising:
a first clamping segment having a first mounting flange and a tubular member extending axially away from the first mounting flange, a first bore defining an interior surface extending through the first mounting flange and the tubular member, the tubular member having an exterior surface, and the first mounting flange being configured for attachment to a rotatable spindle of a machine tool;
a draw bar assembly comprising an elongate shaft that extends axially from a first end to a second end thereof, the elongate shaft extending through the first bore of the first clamping segment;
a biasing unit mounted in engagement with the interior surface or the exterior surface of the tubular member; and
a locking member removably secured to the elongate shaft of the draw bar assembly between the first end and the second end such that the biasing unit is compressed between the locking member and a portion of the first clamping segment, such that the locking member contains the biasing unit on or in the tubular member when the locking member is secured to the elongate shaft and such that the biasing unit is released from the elongate member when the locking member is removed from the elongate shaft;

wherein the biasing unit remains compressed when the first clamping segment is separated from the spindle of the machine tool.

2. The clamping device of claim 1, wherein the first mounting flange is configured for receiving a second clamping segment;

the second clamping segment having a second mounting flange and a collet receiving portion extending axially away from the second mounting flange, a second bore extending through the second mounting flange and the collet receiving portion, the second mounting flange being removably coupled to the first mounting flange; and the draw bar assembly comprising a collet receiving member extending from the elongate shaft and a first portion of the collet receiving member being disposed in the first bore of the first clamping segment and a second portion of the collet receiving member being disposed in the second bore of the second clamping segment.

3. The clamping device of claim 2, further comprising a collet removably coupled to the collet receiving member, the collet having tool or work piece holding jaws formed proximate an end thereof.

4. The clamping device of claim 3, wherein the collet is removably secured to the collet receiving member.

5. The clamping device of claim 3, wherein the collet is removably secured to the collet receiving member by radially rotating the collet into the collet receiving member.

6. The clamping device of claim 3, wherein the collet receiving member comprises a third threaded area and the collet comprises a fourth threaded area which threadlingly engages the third threaded area to removably secure the collet to the collet receiving member.

7. The clamping device of claim 3, wherein the collet receiving member comprises a threaded area for receiving a respective threaded area of the collet.

8. The clamping device of claim 3, wherein the collet receiving member comprises at least one axially extending slot to form at least one axial leg on the collet receiving member.

9. The clamping device of claim 2, wherein the collet receiving member is removably secured to the elongate shaft.

10. The clamping device of claim 2, wherein the collet receiving member is removably secured to the elongate shaft by radially rotating the collet receiving member into the elongate shaft.

11. The clamping device of claim 2, wherein the collet receiving member comprises a first threaded area and the elongate shaft comprises a second threaded area which is in threading engagement with the first threaded area to removably secure the collet receiving member to the elongate shaft.

12. The clamping device of claim 2, wherein the first mounting flange comprises:

a plurality of second threaded bores extending axially at least partially into the first mounting flange, the second mounting flange comprises a plurality of second holes extending axially therethrough, and a plurality of second fasteners extending through a respective one of the second holes and threaded into a respective one of the second threaded bores to removably secure the second mounting flange to the first mounting flange.

13. The clamping device of claim 12, wherein the first mounting flange comprises a plurality of first holes extending axially therethrough and at least a subset of the plurality of the second fasteners extend through a respective one of the plurality of first holes for threading engagement with corresponding first threaded bores in the spindle of the machine tool.

14. The clamping device of claim 2, wherein the second clamping segment comprises a plurality of adjustment screws threaded radially into the second mounting flange for adjusting the angular error of a collet.

15. The clamping device of claim 1, wherein the first clamping segment is configured to receive at least two different size second clamping segments which are configured to receive a respective sized collet.

16. The clamping device of claim 15, further comprising a gap between an outside surface of the elongate shaft and the interior surface defined by the first bore to accommodate radial flexibility of the draw bar.

17. The clamping device of claim 1, wherein the tubular member comprising a radially extending abutment surface that is positioned in the first bore of the tubular member in a predetermined axial position, the abutment surface being configured to engage a circumferential lip extending radially outward from the elongate shaft of the draw bar to limit axial movement of the collet and to prevent damage to the collet.

18. The clamping device of claim 1, wherein the elongate shaft includes at least one recess configured to impart radial flexibility to the elongate shaft.

19. The clamping device of claim 1, wherein the locking member comprises an inside surface that is complementary to and slidingly engages the exterior surface of the tubular member, to guide the draw bar thereby controlling radial eccentricity of the draw bar assembly.

20. The clamping device of claim 1, wherein the locking member comprises an exterior surface that is complementary to and sliding engages an interior surface of the tubular member, to guide the draw bar assembly thereby controlling radial eccentricity of the draw bar assembly.

21. The clamping device of claim 1, wherein locking member is threaded onto a threaded area of the elongate shaft.

22. The clamping device of claim 1, further comprising a first anti-rotation device extending through the locking member and frictionally engaging the elongate shaft to prevent rotation of the locking member relative to the elongate shaft.

23. The clamping device of claim 1, wherein the draw bar comprises a circumferential lip extending radially outward, the circumferential lip having an axial slot formed therein, a second anti-rotation device extends through the tubular member and is positioned in the slot to prevent rotation of the draw bar assembly relative to the tubular member.

24. The clamping device of claim 1, wherein the first mounting flange comprises a plurality of first holes extending axially therethrough.

25. The clamping device of claim 24, further comprising a plurality of first fasteners extending through a respective one of the plurality of first holes for threading engagement with corresponding first threaded bores in the spindle of the machine tool.

26. The clamping device of claim 1, wherein the biasing unit comprises at least one coil spring.

27. The clamping device of claim 1, wherein the biasing unit comprises at least one disc spring.

28. The clamping device of claim 1, wherein the biasing unit engages the locking member and a portion of the first clamping segment.

29. The clamping device of claim 1, wherein when the first clamping segment is secured to the spindle, an axial facing abutment surface of the first mounting flange engages an axial end of the spindle the exterior surface of the tubular member is spaced apart from an inside surface defined by a bore of the spindle.

30. The clamping device of claim 1, wherein the tubular member comprises a radially extending and axially facing abutment surface positioned in the first bore of the tubular member in a predetermined axial position, the abutment surface being configured to engage an axial surface of a circumferential lip extending radially outward from the elongate shaft of the draw bar to limit axial movement of the collet and to prevent damage to the collet, when the work piece is removed from the collet and when the work piece is clamped in the collet a gap is formed between the axial surface and the abutment surface.

* * * * *